United States Patent
Kato et al.

(10) Patent No.: US 7,251,073 B2
(45) Date of Patent: Jul. 31, 2007

(54) PAIR OF BINOCULARS

(75) Inventors: Masashi Kato, Saitama (JP); Hiroaki Ishigaki, Saitama (JP)

(73) Assignee: Kamakura Koki Co., Ltd., Saitama (JP)

( * ) Notice: Subject to any disclaimer, the term of this patent is extended or adjusted under 35 U.S.C. 154(b) by 291 days.

(21) Appl. No.: 10/975,997

(22) Filed: Oct. 29, 2004

(65) Prior Publication Data

US 2006/0033990 A1    Feb. 16, 2006

(30) Foreign Application Priority Data

Aug. 12, 2004   (JP)   ............................. 2004-235257

(51) Int. Cl.
    *G02B 23/22*    (2006.01)
(52) U.S. Cl. .................... 359/410; 359/416; 359/417; 359/418; 359/426
(58) Field of Classification Search ................ 359/407, 359/419, 425, 426, 410, 416–418
See application file for complete search history.

(56) References Cited

U.S. PATENT DOCUMENTS 6,335,825 B1 *   1/2002   Funatsu ...................... 359/412

2003/0095330 A1 *   5/2003   Aikawa ....................... 359/410

FOREIGN PATENT DOCUMENTS

JP    2000-56237 A1    2/2000

\* cited by examiner

*Primary Examiner*—Stephone B. Allen
*Assistant Examiner*—Joshua L. Pritchett
(74) *Attorney, Agent, or Firm*—Rader, Fishman & Grauer PLLC

(57) ABSTRACT

The invention aims at providing a pair of binoculars making it possible to easily perform a focusing operation and a diopter adjustment, and efficiently perform an assembling operation. The present invention provides a pair of binoculars having a pair of supporters for supporting adjustment lenses provided between a pair of ocular optical systems and a pair of objective optical systems so as to be capable of moving forward and backward along the optical axis, a focusing gear for performing a focusing operation by moving said pair of supporters forward or backward at the same time in the direction of optical axis, a diopter adjuster for performing a diopter adjustment by moving one supporter forward or backward in the direction of optical axis as keeping the other supporter stationary, and a focusing and diopter adjusting unit having a changeover gear for changing over the focusing gear and the diopter adjuster to each other.

20 Claims, 4 Drawing Sheets

PAIR OF BINOCULARS

BACKGROUND OF THE INVENTION

1. Field of the Invention

The present invention relates to a pair of binoculars, and more particularly to a pair of binoculars making it possible to easily perform a focusing operation and a diopter adjustment, and efficiently perform an assembling operation.

2. Prior Art

Up to now, there has been demanded a structure making it possible to easily perform a focusing operation and a diopter adjustment in an optical device such as a pair of binoculars and the like.

As a pair of binoculars making it possible to easily perform a focusing operation and a diopter adjustment, there has been proposed, for example, "a pair of binoculars in which two pipe members (1, 1') of said pair of binoculars are connected with each other through two bridges (2, 3) each having a joint in order to adjust an interpupillary distance, said two bridges turn around the axes of joints (4) and are disposed distantly from each other by a specified distance with no connection by the central axis in order to form a penetrating portion (6), said two pipe members (1, 1') have a focusing gear (8) being axially movable for focusing, said focusing gear is operated by a common rotary knob (12) and a gear, said gear extends through one of said bridges (2 or 3) having joints from said rotary knob (12) to said focusing gear (8), and an interpupillary adjustment has no influence on focusing" (see patent literature 1).

[Patent literature 1] Japanese Patent Laid-Open Publication No. 2000-56237 (claim 1)

Hereupon, in the invention described in said patent literature 1, there is performed a focusing operation as described as "A rotary knob is turned at a position where it has been inserted for focusing a pair of binoculars. The turning of the rotary knob is transferred from a rotary knob shaft directly to a friction disk and a projection. The projection engages the friction disk with a helical gear. The turning of the rotary knob is converted into an axial movement of a stop member by the helical gear, and an angular lever moves a focusing gear in the axial direction by an end portion having a fork. Since when a pipe member is turned around the axis the angular lever slides on a conical stop member at its end portion without the action of a gear for converting the turning of the knob into an axial movement of the focusing gear, in a pair of binoculars of the present invention a focusing operation is performed independently of an interpupillary adjustment." (See paragraphs [0030] and [0031] in patent literature 1.)

And in the invention described in patent literature 1 described above, a rotary knob is turned around a joint axis by moving radially an angular lever in order to perform a diopter adjustment. As a result, the turned rotary knob moves a fixed focusing gear in the axial direction.

As described above, in the invention described in patent literature 1, since the amount of movement of a focusing gear in the axial direction is adjusted in order to perform a diopter adjustment, it is necessary to perform such adjustment at plural points as positional adjustment between an angular lever and a supporter, positional adjustment between a coupler and a joint axis, and the like. In the invention described in patent literature 1, therefore, there is a problem that since the above-mentioned members also need to be adjusted in position when assembling the whole of a pair of binoculars it is not possible to efficiently perform the operation of assembling.

SUMMARY OF THE INVENTION

An object of the present invention is to provide a pair of binoculars making it possible to solve such conventional problems, easily perform a focusing operation and a diopter adjustment, and efficiently perform an assembling operation.

As a means for solving said problems, claim 1 proposes a pair of binoculars being provided with a focusing and diopter adjusting unit comprising;

a pair of supporters for supporting adjustment lenses provided between a pair of ocular optical systems and a pair of objective optical systems so as to be capable of moving forward and backward along their optical axes, a focusing gear for performing a focusing operation by moving said pair of supporters forward or backward at the same time in the direction of optical axis, a diopter adjuster for performing a diopter adjustment by moving one supporter forward or backward in the direction of optical axis as keeping the other supporter stationary, and a changeover gear for changing over said focusing gear and said diopter adjuster to each other; and claim 2 proposes a pair of binoculars according to claim 1, wherein;

said focusing gear is provided with a lead ring being rotatably mounted on a fixed central shaft, having a large diameter portion having an external thread on its outer circumferential face and a small diameter portion having an external thread on its outer circumferential face, and making said large diameter portion support one supporter supporting one adjustment lens so as not to be capable of turning, and a first rotary member being coupled with said lead ring by screw-engagement and making said lead ring move forward and backward by turning, said diopter adjuster is provided with a small lead ring being rotatably supported by said lead ring and supporting the other supporter supporting the other adjustment lens, and said changeover gear is provided with a second rotary member making it possible to transfer rotation to said first rotary member under a state where rotation cannot be transferred to said small lead ring when moving in one direction along the axis of the fixed central shaft and making it possible to transfer rotation to said small lead ring under a state where rotation cannot be transferred to said first rotary member when moving in the other direction along the axis of the fixed central shaft.

According to the invention of claim 1, it is possible to provide a pair of binoculars provided with a focusing and diopter adjusting unit making it possible to perform a focusing operation by moving a pair of supporters forward or backward at the same time in the direction of optical axis when having a focusing gear changed over by operating a changeover gear, and perform a diopter adjustment by moving one supporter out of the pair of supporters forward or backward in the direction of optical axis as keeping the other supporter stationary when having a diopter adjuster changed over by operating the changeover gear. Since this focusing and diopter adjusting unit is literally unitized, it is possible to efficiently and easily assemble a pair of binoculars. And since in a pair of binoculars according to the invention of claim 1 said focusing gear and said diopter adjuster are changed over to each other by a one-touch operation by means of a changeover gear, it is possible to easily perform a focusing operation and a diopter adjustment. Furthermore, according to the invention of claim 1, since it is possible to arrange a focusing and diopter adjusting unit in the middle of the body of a pair of binoculars and thereby perform a focusing operation as securely holding the pair of binoculars, it is possible to observe a stable image being little shaked.

According to the invention of claim 2, the diopter adjuster is changed over to the focusing gear by sliding the second rotary member of the changeover gear along the axis of the fixed central shaft, and when the second rotary member is turned the first rotary member is turned, and since the lead ring makes the large diameter portion support one supporter supporting one adjustment lens so as not to be capable of turning, when the first rotary member is turned the lead ring itself is not turned and since the lead ring is screw-engaged with the first rotary member, the lead ring moves forward or backward, and since the small lead ring is rotatably coupled with the lead ring but the lead ring moves forward or backward without turning, the small lead ring itself also moves forward or backward together with the lead ring without turning, and as a result one supporter supported by the lead ring and the other supporter supported by the small lead ring move forward or backward by the same distance and due to a fact that the pair of supporters move forward or backward, a focusing operation by movement of adjustment lenses supported by the supporters is performed. And the focusing gear is changed over to the diopter adjuster by sliding the second rotary member along the axis of the fixed central shaft, and when the second rotary member is turned the first rotary member is not turned since the turning of the second rotary member is not transferred to the first rotary member, and therefore one supporter supported by the lead ring stays at this position without moving forward or backward, and since the turning of the second rotary member is transferred to the small lead ring, due to a fact that the small lead ring is turned relative to the small diameter portion of the lead ring, the small lead ring moves forward or backward relative to the lead ring and thereby the other supporter supported by the small lead ring moves forward or backward, and as a result a diopter adjustment is performed. Thus, according to the invention of claim 2, it is possible to provide a pair of binoculars making it possible to easily perform a focusing operation and a diopter adjustment. Since this focusing and diopter adjusting unit is literally unitized, it is possible to efficiently and easily perform an assembling operation of a pair of binoculars themselves. And since in a pair of binoculars according to the invention of claim 2 said focusing gear and said diopter adjuster are change over to each other by a one-touch operation by means of a changeover gear, it is possible to easily perform a focusing operation and a diopter adjustment. Furthermore, according to the invention of claim 2, since it is possible to arrange a focusing and diopter adjusting unit in the middle of the body of a pair of binoculars and thereby perform a focusing operation as securely holding the pair of binoculars, it is possible to observe a stable image being little shaked.

DETAILED DESCRIPTION OF THE PREFERRED EMBODIMENTS

Figure 1:
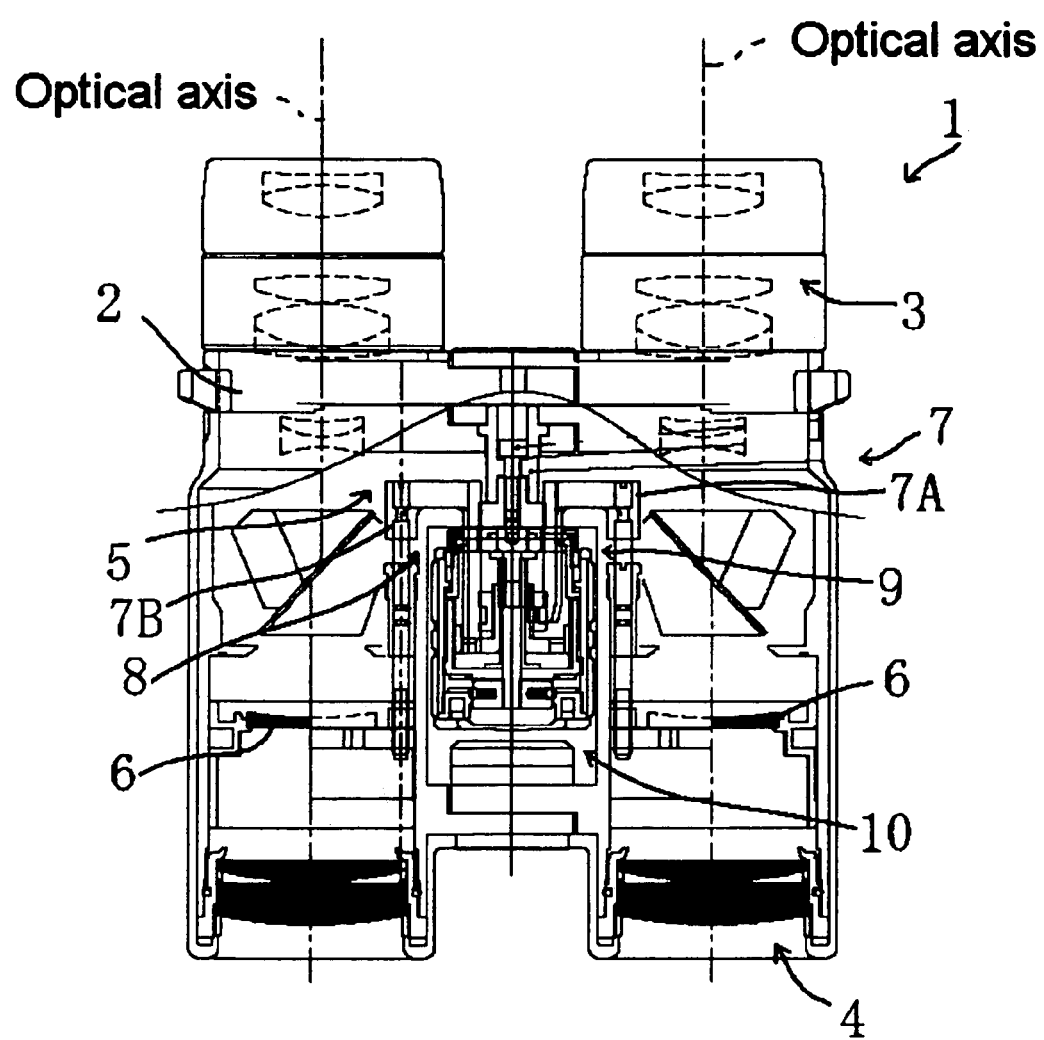
FIG. 1 is a plan view showing the whole of a pair of binoculars according to the present invention.

FIG. 1 is a plan view showing the whole of a pair of binoculars as an example of the present invention. A pair of binoculars 1 comprises a binocular enclosure body 2, a pair of ocular optical systems 3, a pair of objective optical systems 4, a focusing and diopter adjusting unit 5 and a pair of adjustment lenses 6.

The binocular enclosure body 2 has a pair of lens barrels 2A. And the ocular optical systems 3 and the objective optical systems 4 are provided in the pair of lens barrels 2A. The ocular optical system 3 and the objective optical system 4 each are composed of one or more optical lenses. In this specification, the ocular optical system 3 side may be referred to as the upper side and the objective optical system 4 side may be referred to as the lower side.

The adjustment lenses 6 are provided between the pair of ocular optical systems 3 and the pair of objective systems 4. Lens 6 is composed of an optical lens.

The focusing and diopter adjusting unit 5 is provided with a pair of supporters 7, a focusing gear 8, a diopter adjuster 9 and a changeover gear 10.

Figure 2:
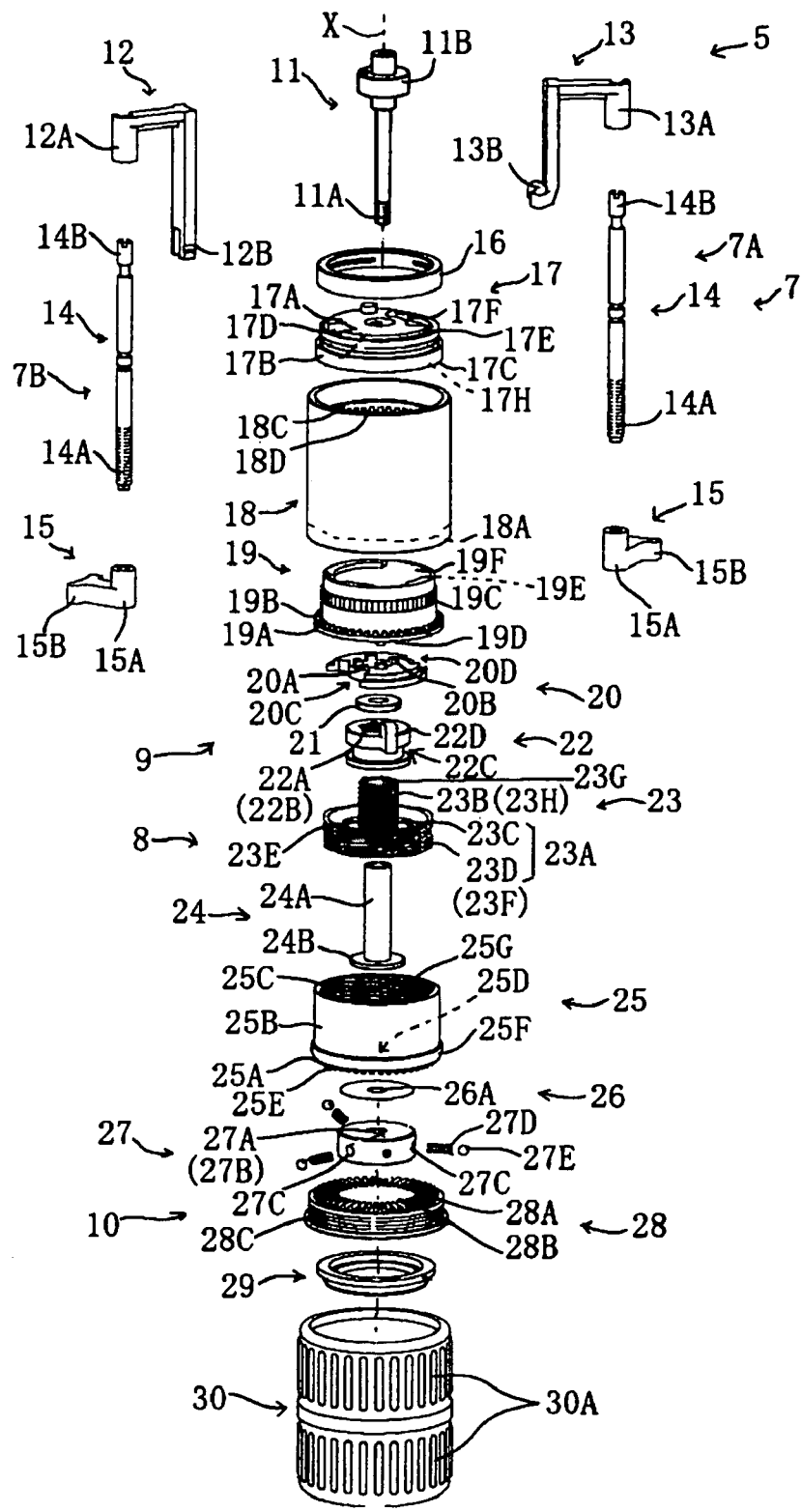
FIG. 2 is an exploded perspective view of a focusing and diopter adjusting unit of a pair of binoculars according to the present invention.

As shown in FIG. 1, the pair of supporters 7 support or hold the adjustment lenses 6. As shown in FIG. 2, while the pair of supporters are the same as each other in supporting the adjustment lenses, one supporter 7A supports one adjustment lens 6 in order to perform either of a diopter adjustment and a focusing operation and the other supporter 7B supports the other adjustment lens 6 in order to perform a focusing operation.

Each of the pair of supporters 7 (7A, 7B) is provided with a fixing portion 15 for fixing an adjustment lens 6, said fixing portion being arranged so as to hold said adjustment lens 6 perpendicularly to the optical axis, a coupling pin 14 being coupled with said fixing portion 15 and extending in the direction of optical axis, and a right bridge 13 or a left bridge 12 being coupled to the coupling pin 14 and related directly or indirectly to a lead ring 23 described later. In this embodiment, one supporter 7A out of the pair of supporters 7 is arranged at the right side in FIG. 2, and the other supporter 7B is arranged at the left side in FIG. 2.

As shown in FIG. 2, one supporter 7A comprises a right bridge 13, a coupling pin 14 and a fixing portion 15.

The right bridge 13 is a rod-shaped member being nearly J-shaped. The right bridge 13 has a nearly cylinder-shaped pin supporting portion 13A formed at an end of a short rod and a second engagement portion 13B formed at an end of a long rod. The second engagement portion 13B has an end portion having a fan shape cut in the shape of a semicircle, said end portion facing a direction perpendicular to the axial direction. This second engagement portion 13B is engaged with a small lead ring 22, as described later.

An external thread 14A is formed on an end portion of the coupling pin 14. A coupling portion 14B is formed on the base end of the coupling pin 14. The coupling portion 14B couples integrally the right bridge 13 with the coupling pin 14 by being coupled with the pin supporting portion 13A.

The fixing portion 15 has a cylinder portion 15A and a connecting portion 15B extending from and perpendicularly to the cylinder portion 15A. The cylinder portion 15A is joined to the coupling pin 14 by being screw-engaged with the external thread 14A and the connecting portion 15B has an adjustment lens 6 attached to it.

The other supporter 7B comprises a left bridge 12, a coupling pin 14 and a fixing portion 15.

The left bridge 12 is a rod-shaped member being nearly J-shaped. The left bridge 12 has a nearly cylinder-shaped pin supporting portion 12A formed at an end of a short rod and a first engagement portion 12B formed at an end of a long rod. The first engagement portion 12B has an end portion formed into a fork extending in the direction of optical axis. This first engagement portion 12B is connected with a lead ring 23, as described later.

The left bridge 12 holds an adjustment lens 6 in the same manner as the right bridge 13. That is to say, an external thread 14A is formed on an end portion of the coupling pin 14. A coupling portion 14B is formed on the base end of the coupling pin 14. The coupling portion 14B couples integrally the left bridge 12 with the coupling pin 14 by being coupled with the pin supporting portion 12A of the left bridge 12. The fixing portion 15 has a cylinder portion 15A and a connecting portion 15B extending from and perpendicularly to the cylinder portion 15A. The cylinder portion 15A is joined to the coupling pin 14 by being screw-engaged with the external thread 14A and the connecting portion 15B has an adjustment lens 6 attached to it.

As shown in FIG. 1, the focusing gear 8 performs a focusing operation by moving said pair of supporters 7 abreast, in other words, forward or backward at the same time in the direction of optical axis.

As shown in FIG. 1, the diopter adjuster 9 performs a diopter adjustment by moving one supporter 7A forward or backward in the direction of optical axis while keeping the other supporter 7B stationary.

As shown in FIG. 1, the changeover gear 10 changes over said focusing gear 8 and said diopter adjuster 9 to each other.

As shown in FIG. 2, the focusing and diopter adjusting unit 5 comprises said pair of supporters 7A and 7B, a fixed central shaft 11, a diopter scale ring 16, a focusing wheel holder 17, an outer focusing frame 18, a diopter ring 19, a diopter ring holder 20, a washer for focusing wheel 21, a small lead ring 22, a lead ring 23, a focusing wheel pipe 24, a focusing wheel 25, a focusing wheel holding washer 26, a focusing wheel holding ring 27, a focusing wheel connecting ring 28, a cover for focusing wheel 29 and an operation ring for focusing wheel 30. In this embodiment, said outer focusing frame 18 corresponds to a second rotary member in the present invention and said focusing wheel 25 corresponds to a first rotary member in the present invention.

The fixed central shaft 11 has the focusing wheel holding ring 27 integrally joined to it by screw-engaging an external thread 11A formed on one end portion of it with an internal thread 27B formed on the internal circumferential face of a central threaded hole 27A of the focusing wheel holding ring 27. A large diameter drum portion 11B is formed on the other end portion of this fixed central shaft 11, and the focusing wheel 25, the focusing wheel pipe 24, the lead ring 23, the small lead ring 22, the washer for focusing wheel 21, the diopter ring holder 20, the diopter ring 19 and the focusing wheel holder 17 are mounted between this large diameter drum portion 11B and said focusing wheel holding ring 27.

The focusing wheel holding ring 27 is formed into a disk, and steel balls 27E each being energized in an outward projecting direction by a coil spring 27D inserted into each of circumferential side face holes 27C provided so as to be at an angle of 90 degrees with one another with regard to the central axis are mounted in the circumferential side wall of the focusing wheel holding ring 27.

It is a focusing wheel holding washer that is shown by numeral 26 in FIG. 2. A central hole 26A is formed at the center of this focusing wheel holding washer 26, and the fixed central shaft 11 is inserted into the central hole 26A.

Figure 3:
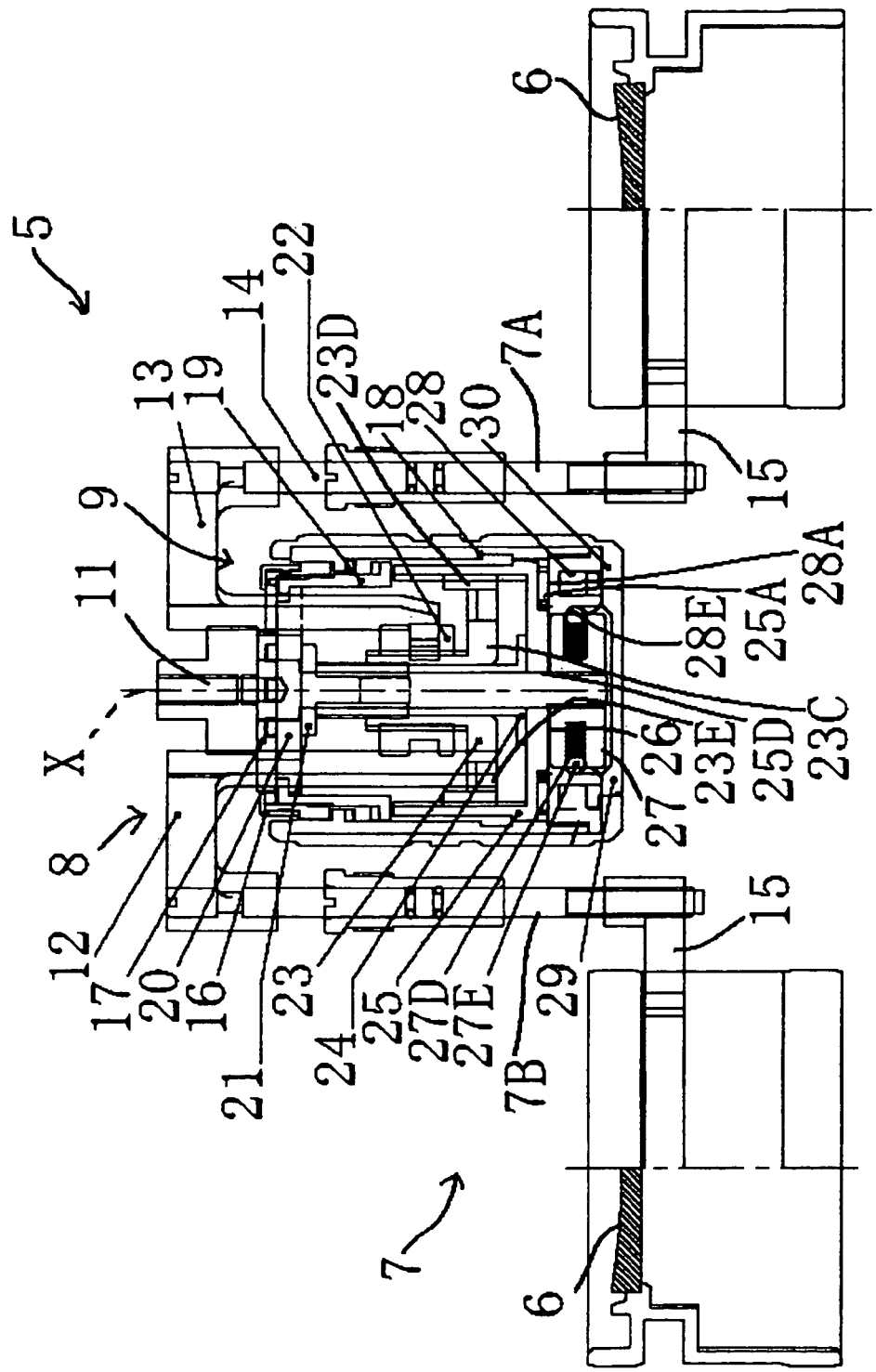
FIG. 3 is a schematic figure at the time of focusing of a focusing and diopter adjusting unit of a pair of binoculars according to the present invention.

As shown in FIGS. 2 and 3, the focusing wheel 25 is formed into a bottomed cylinder provided with a bottom portion 25A having at its center the central hole 25D for having the fixed central shaft 11 inserted into it and with a cylinder portion 25B standing from the circumferential edge of the bottom portion 25A and having an opening 25C being opened upward, and the teeth of comb 25E are formed in the shape of a ring on the circumferential edge of the bottom portion 25A. An internal thread 25G is formed on the internal circumferential face of the cylinder portion 25B of this focusing wheel 25.

The focusing wheel pipe 24 has a pipe portion 24A and a flange portion 24B provided on an end of the pipe portion 24A and has said fixed central shaft 11 mounted in it so that said flange portion 24B abuts against the internal bottom face of said bottom portion 25A.

The lead ring 23 is mounted on the outside of this focusing wheel pipe 24. This lead ring 23 has a ring portion 23A and a central pipe portion 23B. In this embodiment, said ring portion 23A corresponds to a large diameter portion in the present invention and said central pipe portion 23B corresponds to a small diameter portion in the present invention.

The lead ring 23 is mounted on the focusing wheel pipe 24 by inserting the focusing wheel pipe 24 into the central hole 23G of this central pipe portion 23B. The ring portion 23A has a disk-shaped flange portion 23C formed on an end of said central pipe portion 23B and a cylinder portion 23D being formed on the outer edge of this disk-shaped flange portion 23C and having the central axis of this lead ring 23 as its axis. An external thread 23H is formed on the outer circumferential face of said central pipe portion 23B. An insertion hole 23E for having the first engagement portion 12B inserted into it is made in said disk-shaped flange portion 23C, and an external thread 23F to be screw-engaged with said internal thread 25G is formed on the outer circumference of said cylinder portion 23D.

The smaller lead ring 22 comprises a central axial hole 22A having an internal thread 22B formed on its internal circumferential face, an engagement groove 22C formed between an upper flange and a lower flange on the outer circumference of it, and an engagement projection 22D formed on the outer circumference of said upper flange. The small lead ring 22 is rotatably mounted on the central pipe portion 23B by screw-engaging said external thread 23H and said internal thread 22B with each other. The right bridge 13 is engaged with the small lead ring 22 by inserting the second engagement portion 13B into the engagement groove 22C.

The diopter ring holder 20 is arranged on the top of the small lead ring 22 inserted over the focusing wheel pipe 24 in a state where the diopter ring holder is inserted through the washer for focusing wheel 21 on the focusing wheel pipe 24.

The diopter ring holder 20 has the shape of a nearly circular disk having a central hole 20A, and comprises central projections 20B formed on the upper face of it, said projections being arranged so as to be at an angle of 90 degrees with one another with respect to the central axis in the vicinity of said central hole 20A, and a fan-shaped notch 20C and a rectangular notch 20D formed by cutting out parts of the circumferential edge of the disk. Said rectangular notch 20D has the long rod of the left bridge 12 inserted into it and said fan-shaped notch 20C has the long rod of the right bridge 13 inserted into it.

The diopter ring 19 is in the shape of a cylinder being opened at both ends of it and comprises a flange portion 19A around an opening at one end, and the teeth of comb 19B are formed on a ring-shaped portion of the flange portion 19A at the outer circumferential side of the diopter ring 19. The teeth of comb 19C making a round are formed on the circumferential side face of the diopter ring 19. End face projections 19E are formed on the end face of the other end opening of the diopter ring 19.

A pair of holding pieces 19D extending opposite to each other toward the axis are formed in the opening at said flange portion 19A side on the internal circumferential face of the diopter ring 19 so as to protrude toward the inside of the diopter ring 19, and a groove is formed by this pair of holding pieces 19D. The engagement projection 22D of the small lead ring 22 is inserted into the groove formed by this pair of holding pieces 19D.

The focusing wheel holder 17 is formed into a ceilinged cylinder having a ceiling portion 17A, a cylindrical side face portion 17B and an opening 17C being opened at the bottom side. The ceiling portion 17A has a rectangular through hole 17D, an outer peripheral through hole 17E and a fan-shaped through hole 17F formed in it. The rectangular through hole 17D has the long rod of the left bridge 12 inserted into it to prevent the inserted left bridge 12 from turning around the axis.

The outer peripheral through hole 17E is opened over a specific length along the outer circumference at the rectangular through hole 17D side to form an opening common with said rectangular through hole 17D. The end face projection 19E of the diopter ring 19 is inserted into this outer peripheral through hole 17E so as to control the turning of the diopter ring 19 by the opening length of said diopter ring 19. The fan-shaped through hole 17F has the long rod of the right bridge 13.

Four unshown depressions are formed on the lower face of the ceiling portion 17A. The diopter ring holder 20 can be attached integrally to the lower face of the ceiling portion 17A of the focusing wheel holder 17 by fitting the central projections 20B of the diopter ring holder 20 into these four unshown depressions. Inner circumferential projections 17H extending toward the central axis along the axial direction are formed on the inner circumferential face of the opening 17C.

The inner circumferential projections 17H are formed at two positions being symmetrical with respect to the central axis X. These two inner circumferential projections 17H are made so as to engage with the teeth of comb 19C of the diopter ring 19 at the time of mounting the diopter ring 19 on this focusing wheel holder 17, and said inner circumferential projections 17H move as getting over the surfaces of said teeth of comb 19C when the diopter ring 19 is turned.

It is a diopter scale ring to be mounted on the outer circumference of said focusing wheel holder 17 that is shown by numeral 16. A scale is formed on the outer circumference of the diopter scale ring 16. Thanks to a fact that the scale is formed on the outer circumferential face of the diopter scale ring 16, it is possible to control the degree of a diopter adjustment at the time of diopter adjustment described later.

Between the large diameter drum portion 11B of this fixed central shaft 11 and said focusing wheel ring holder 27, the focusing wheel 25, the focusing wheel pipe 24, the lead ring 23, the small lead ring 22, the washer for focusing wheel 21, the diopter ring holder 20, the diopter ring 19 and the focusing wheel holder 17 are mounted in an integrally coupled state in the outer focusing frame 18.

The outer focusing frame 18 is in the shape of a cylinder being opened at both of the upper and lower ends. An internal thread 18A is formed on the lower end side inner circumferential face of the outer focusing frame 18. A protruded stripe 18C is formed along the direction of circumference on the upper end side inner circumferential face. The teeth of comb 18D extending downward are formed at the side of the protruded stripe 18C. The teeth of comb 18D are formed so as to be capable of engaging with the teeth of comb 19B of the diopter ring 19.

The focusing wheel connecting ring 28 is mounted on the lower end opening of said outer focusing frame 18.

As shown in FIG. 2, the focusing wheel connecting ring 28 is a disk-shaped member. The teeth of comb 28A are formed upward in the shape of a ring on the upper face of the focusing wheel connecting ring 28. The teeth of comb 28A are engaged with the teeth of comb 25E of the focusing wheel 25 at the time of focusing. As shown in FIG. 3, the turning of the focusing wheel connecting ring 28 is transferred to the focusing wheel 25 by engaging the teeth of comb 28A with the teeth of comb 25E at the time of focusing.

As shown in FIG. 2, an external thread 28C is formed in the direction of circumference on the outer circumferential side face of the focusing wheel connecting ring 28. The outer focusing frame 18 and the focusing wheel connecting ring 28 ar integrally connected by screw-engaging the external thread 28C with the inner thread 18A.

A mounting hole 28B is made in the central part of the focusing wheel connecting ring 28 and the focusing wheel holding ring 27 is inserted into this mounting hole 28B. A ring-shaped projection 28E is formed on the inner circumferential face of this mounting hole 28B.

In FIG. 2, it is a cover for focusing wheel that is shown by numeral 29. The cover for focusing wheel 29 is in the shape of a circular dish. The cover for focusing wheel 29 is fixed on the focusing wheel connecting ring 28. It is an operation ring for focusing wheel that is shown by numeral 30, and this is mounted on the outer circumferential face of the outer focusing frame 18. Slip-preventing projections 30A are formed on the outer circumferential face of the operation ring for focusing wheel 30.

First, referring to FIGS. 2 and 3, the operation of the focusing and diopter adjusting unit 5 at the time of focusing is described. That is to say, the operation of the focusing gear 8 is described.

When the operation ring for focusing wheel 30 is turned in a state of FIG. 3, the outer focusing frame 18 integrally covered with the operation ring for focusing wheel 30 is turned and this turning of the outer focusing frame 18 engages the external thread 28C of the focusing wheel connecting ring 28 with the internal thread 18A of the outer focusing frame 18; and since the focusing wheel connecting ring 28 and the outer focusing frame 18 are integrally coupled with each other, the focusing wheel connecting ring 28 is turned.

On the other hand, due to a fact that the long rod of the left bridge 12 is inserted into the rectangular through hole 17D of the focusing wheel holder 17 and the rectangular notch 20D of the diopter ring holder 20, the left bridge 12 cannot be turned around the central axis X. Since the first engagement portion 12B of the left bridge 12 being not capable of turning is engaged with the insertion hole 23E, even when said focusing wheel 25 is turned the lead ring 23 cannot be turned and therefore, the lead ring 23 moves forward or backward in accordance with the direction of turning of the focusing wheel 25.

The small lead ring 22 coupled with the lead ring 23 by a fact that the external thread 23H and the internal thread 22B are engaged with each other moves forward or backward without turning in accordance with the forward or backward movement of the lead ring 23.

Since the second engagement portion 13B is engaged with the engagement groove 22C of this small lead ring 22, the right bridge 13 is moved forward or backward by the forward or backward movement of the small lead ring 22.

Since the lead ring 23 and the small lead ring 22 move forward or backward in an unturnable state, the left bridge 12 and the right bridge 13 move abreast, namely, forward or backward by the same distance along the direction of optical axis.

In this embodiment, since the focusing gear 8 is thus composed of the focusing wheel 25 turned by the turning of the focusing wheel connecting ring 28 turned by turning the outer focusing frame 18, the lead ring 23 being controlled so as not to turn by the turning of the focusing wheel 25 and being engaged with and supporting the left bridge 12, and the small lead ring 22 being mounted on said lead ring 23 and being engaged with and supporting the right bridge 13, a focusing operation is performed by moving the left bridge 12 and the right bridge 13 forward or backward by the same distance along the optical axis by turning the outer focusing frame 18.

Next, the operation of the focusing and diopter adjusting unit 5 at the time of diopter adjustment is described with reference to FIGS. 2 and 4. That is to say, the operations of the diopter adjuster 9 and the changeover gear 10 are described.

Figure 4:
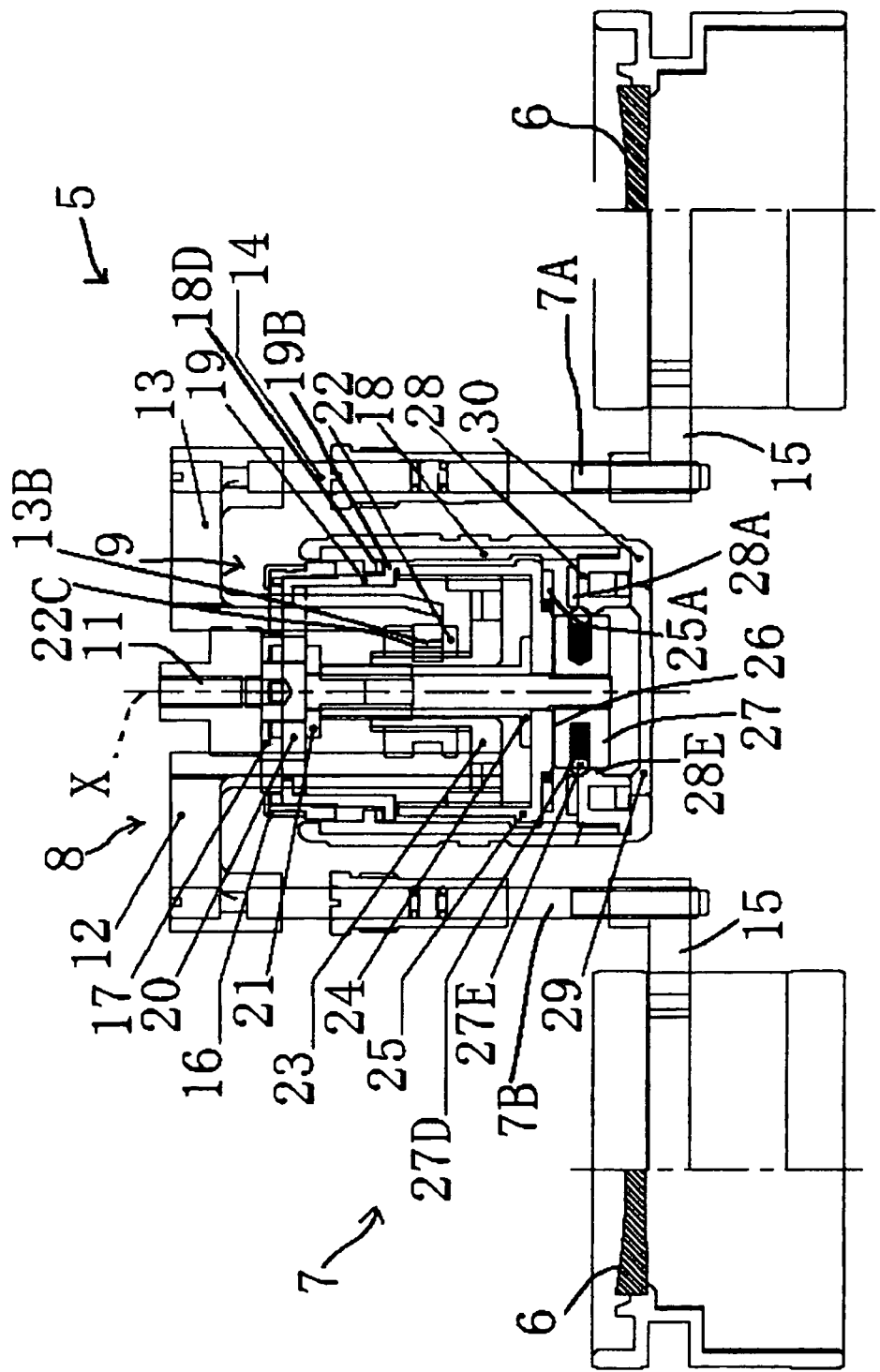
FIG. 4 is a schematic figure at the time of diopter adjustment of a focusing and diopter adjusting unit of a pair of binoculars according to the present invention.

First, as shown in FIGS. 2 and 4, the outer focusing frame 18 is axially slid by operating the operation ring for focusing wheel 30, and the focusing gear 8 is changed over to the diopter adjuster 9.

Describing in more detail, when the outer focusing frame 18 is slid in the axial direction, the focusing wheel connecting ring 28 moves and the ring-shaped projection 28E gets over steel balls 27E. Since each of the steel balls 27E is elastically energized by a coil spring 27D, when the ring-shaped projection 28E gets over the steel balls 27E, each steel ball 27E operates so as to be embedded into a circumferential side face hole 27C. And the ring-shaped projection 28E can smoothly get over the steel balls 27E.

When the ring-shaped projection 28E passes the steel balls 27E, the steel balls return to the original positions so as to project from the circumferential side face holes 27C due to energizing forces of the coil springs 27D. The ring-shaped projection 28E is made not to be capable of freely returning to the original position by a hindrance of the projected steel balls 27E due to a fact that the steel balls 27E return to their original positions. And the engagement between the teeth of comb 25E and the teeth of comb 28A is released and thus the turning of the outer focusing frame 18 is made not to be transferred to the focusing wheel 25.

And when said outer focusing frame 18 is slid in the axial direction, the teeth of comb 18D and the teeth of comb 19B are engaged with each other.

In a state of FIG. 4, when the operation ring for focusing wheel 30, namely, the outer focusing frame 18 is turned, the focusing wheel connecting ring 28 is turned but the focusing wheel is not turned.

On the other hand, the diopter ring 19 is turned by turning the outer focusing frame 18. The diopter ring 19 turns the small lead ring 22 by the turning of the diopter ring 19, since its holding pieces 19D hold the engagement projection 22D.

Since the lead ring 23 is held so as not to be turnable by being engaged with the first engagement portion 12B of the left bridge 12 controlled so as not to be turnable by the focusing wheel holder 17 and the diopter ring holder 20, when the small lead ring 22 is turned, the lead ring 23 moves forward or backward along the central pipe portion 23B of the lead ring 23. Then, when the small lead ring 22 moves forward or backward, the right bridge 13 engaging the second engagement portion 13B with the engagement groove 22C of the small lead ring 22 moves forward or backward along the central axis X. Since the lead ring 23 is not turned, the left bridge 12 is stationary at its position without moving forward or backward. As a result, a diopter adjustment is performed by the forward or backward movement of the right bridge 13.

Thus, in this embodiment, since the diopter adjuster 9 is composed of the diopter ring 19 turned by turning the outer focusing frame 18, the lead ring 23 being controlled not to be capable of being turned by the turning of the outer focusing frame 18 and engaging with and supporting the left bridge 12, and the small lead ring 22 being mounted on said lead ring 23 so as to be turned by the turning of said diopter ring 19 and engaging with and supporting the right bridge 13, the right bridge 13 is made to move forward or backward by a specified distance along the optical axis without turning the left bridge 12 by turning the outer focusing frame 18, and thereby a diopter adjustment is performed.

And in this embodiment, since the changeover gear 10 for the focusing gear 8 and the diopter adjuster 9 is composed of the outer focusing frame 18 provided with the teeth of comb 18D to be engaged with the teeth of comb 19B of the diopter ring 19 and the focusing wheel connecting ring 28 being coupled with this outer focusing frame 18 and being provided with the teeth of comb 28A to be engaged with the teeth of comb 25E of the focusing wheel 25, it is possible to easily change over the focusing gear 8 and the diopter adjuster 9 to each other by only sliding the outer focusing frame 18 in the axial direction.

Furthermore, in a pair of binoculars according to the present invention, a diopter adjustment is performed by moving one supporter 7A composed of the right bridge 13 straight in the direction of optical axis as keeping the other supporter 7B composed of the left bridge 12 stationary. Therefore, since the supporter 7 unrelated to diopter adjustment is temporarily fixed, it is possible to prevent defocusing.

The present invention is not limited to the above-described embodiment but includes variations and improvements within the scope making it possible to attain objects of the present invention. A concrete structure, shape and the like for implementing the present invention may be another structure and the like within the scope making it possible to attain the objects of the invention.

What is claimed is:

1. A pair of binoculars comprising;
   a pair of supporters for supporting adjustment lenses provided between a pair of ocular optical systems and a pair of objective optical systems so as to be capable of moving forward and backward along the optical axes,
   a focusing gear for performing a focusing operation by moving said pair of supporters forward or backward at the same time in the direction of optical axis, a diopter adjuster for performing a diopter adjustment by moving one supporter forward or backward in the direction of optical axis while keeping the other supporter stationary, and a single focusing and diopter adjusting unit for operating both of the focusing gear and the diopter adjuster, having a changeover gear choosing between the focusing gear and the diopter adjuster to be controlled at a time with the focusing and diopter adjusting unit.

2. A pair of binoculars according to claim 1, wherein;

said focusing gear is provided with a lead ring being rotatably mounted on a fixed central shaft, having a large diameter portion and a small diameter portion and making said large diameter portion support one supporter supporting one adjustment lens so as not to be turnable, and a first rotary member being coupled with said lead ring by screw-engagement and making said lead ring move forward and backward by turning, said diopter adjuster is provided with a small lead ring being rotatably supported by said lead ring and supporting the other supporter supporting the other adjustment lens, and said changeover gear is provided with a second rotary member making it possible to transfer rotation to said first rotary member under a state where rotation cannot be transferred to said small lead ring when the same changeover gear is moved in one direction along the axis of the fixed central shaft to a first location, and making it possible to transfer rotation to said small lead ring under a state where rotation cannot be transferred to said first rotary member when said changeover pear is moved in the other direction along the axis of the fixed central shaft to a second location.

3. The pair of binoculars according to claim 2, wherein said large portion is provided with a first external thread in the outer circumferential face thereof and said small portion is provided with a second external thread in the outer circumferential face thereof; or said first rotary member is in a shape of a hollow cylinder with one bottom on the side of the objective optical systems and is provided with a first internal thread in the inner peripheral face thereof, and said large portion are coupled with said first rotary member by screw-engagement between said first external thread and said first internal thread; and said small lead ring is provided with a second internal thread in the inner peripheral face thereof, and is rotatably supported by the small portion of said lead ring by screw-engagement between said second external thread and said second internal thread.

4. A pair of binoculars according to claim 3, further comprising a focusing wheel connecting ring in a shape of a hollow disk with an ocular-optical-system-side end face having an opening and an objective-optical-system-side end face, said focusing wheel connecting ring provided with a third external thread in the outer peripheral face thereof, and first teeth of comb on the first end face thereof, wherein said second rotary member is in the shape of a hollow cylinder with both ends opening, an objective-optical-system-side end of the inner peripheral face of which is provided with a third inner internal thread, and said focusing wheel connecting ring is fixedly mounted on said second rotary member by screw-engagement between said third external thread and the third internal thread; and said first rotary member is provided with second teeth of comb in the peripheral edge of said bottom thereof, and said first teeth of comb is engaged with said second teeth of comb when the changeover gear is in the first location, whereby rotation of the second rotary member is transferred to said lead ring through said focusing wheel connecting ring and the first rotary member in this order.

5. A pair of binoculars according to claim 4, further comprising a diopter ring provided with a flange portion fixed to an end periphery on the objective-optical-system side thereof, third teeth of comb formed in the ocular-optical-system-side face of said flange portion, and a pair of holding pieces protruding from the objective-optical-system-side face of said flange portion, wherein said small lead ring is provided with flanges fixed respectively to an end periphery on the ocular-optical-system side thereof and to an end periphery on the objective-optical-system side thereof, and said ocular-optical-system-side flange is provided with an engagement projection at a part on the periphery thereof, which engagement projection is engaged with said pair of holding pieces;

said second rotary member is provided with a protruding stripe along the circumference of the inner sidewall thereof near the ocular-optical-system-side end thereof, and an objective-optical-system-side face of said protruding stripe is provided with fourth teeth of comb to be engaged with the third teeth of comb when the changeover gear is in the second location, whereby rotation of the second rotary member is transferred to said small lead ring through the engagement between said forth teeth of comb and said third teeth of comb, and the engagement between said pair of holding pieces and said engagement projection in this order.

6. The pair of binoculars according to claim 5, wherein said second rotary member is provided with a protruding stripe along the circumference of the inner sidewall thereof near the ocular-optical-system-side end thereof, and an objective-optical-system-side face of said protruding stripe is provided with fourth teeth of comb to be engaged with said third teeth of comb when the changeover gear is in the second location; and said fourth teeth of comb is disengaged from said third teeth of comb when the changeover gear is in the first location.

7. The pair of binoculars according to claim 6, wherein said one supporter comprises a fixing portion for fixing said one adjustment lens, a coupling pin being coupled with said fixing portion , and a left bridge coupled with said coupling pin and associated with said lead ring;

wherein said left bridge is a nearly J-shaped rod comprising a short rod portion, a connecting rod portion, one end of which is connected with one end of said short rod portion, and a long rod portion connected with the other end of said connecting rod portion; and said left bridge having a pin-supporting portion formed at an unconnected end of said short rod portion for the coupling with said coupling pin, and a first engagement portion formed at an unconnected end of said long rod portion and extending in the direction of the optical axis, wherein said large diameter portion of said lead ring comprises a disk-shaped flange portion formed on the objective-optical-system-side end of said small diameter portion and a cylinder portion standing parallel with said fixed central axis from the periphery of said disk-shaped flange portion wherein said first external thread is formed in the outer circumferential face of said cylinder portion; and said disk-shaped flange portion is provided with an insertion hole for receiving said first engagement portion.

8. The pair of binoculars according to claim 6, wherein said other supporter comprises a fixing portion for fixing said other adjustment lens, a coupling pin being coupled with said fixing portion, and a right bridge coupled with said coupling pin and associated with said small lead ring;

wherein said right bridge is a nearly J-shaped rod comprising a short rod portion, a connecting rod portion, one end of which is connected with one end of said short rod portion, and a long rod portion connected with the other end of said connecting rod portion; and said right bridge having a pin-supporting portion formed at an unconnected end of said short rod portion for the coupling with said coupling pin, and a second engagement portion formed at an unconnected end of said long rod portion, with a fan shape cut in the shape of a semicircle, the face of said fan facing in the direction of the optical axis, wherein said small lead ring has an engagement groove formed between said flanges fixed respectively to an end periphery on the ocular-optical-system side thereof and to an end periphery on the objective-optical-system side thereof, for engaging with said second engagement portion.

9. A pair of binoculars according to claim 5, further comprising a focusing wheel holding ring fixedly mounted on said fixed central shaft, said focusing wheel holding ring being in a shape of a disk, with holes in the circumferential wall thereof, wherein steel balls, each of which is energized in an outward-projecting direction by a coil spring inserted into each of the holes, are placed in the respective entrances of said holes, wherein said focusing wheel connecting ring is provided with a ring-shaped projection formed on the inner circumferential face thereof, whereby said changeover gear is fixedly in the first location when said steel balls are on the side of the objective-optical-system-side face of said ring-shaped projection, and said changeover gear is fixedly in the second location when said steel balls are on the side of the ocular-optical-system-side face of said ring-shaped projection.

10. The pair of binoculars according to claim 9, wherein said one supporter comprises a fixing portion for fixing said one adjustment lens, a coupling pin being coupled with said fixing portion, and a left bridge coupled with said coupling pin and associated with said lead ring;

wherein said left bridge is a nearly J-shaped rod comprising a short rod portion, a connecting rod portion, one end of which is connected with one end of said short rod portion, and a long rod portion connected with the other end of said connecting rod portion; and said left bridge having a pin-supporting portion formed at an unconnected end of said short rod portion for the coupling with said coupling pin, and a first engagement portion formed at an unconnected end of said long rod portion and extending in the direction of the optical axis, wherein said large diameter portion of said lead ring comprises a disk-shaped flange portion formed on the objective-optical-system-side end of said small diameter portion , and a cylinder portion standing parallel with said fixed central axis from the periphery of said disk-shaped flange portion wherein said first external thread is formed in the outer circumferential face of said cylinder portion; and said disk-shaped flange portion is provided with an insertion hole for receiving said first engagement portion.

11. The pair of binoculars according to claim 10, wherein said other supporter comprises a fixing portion for fixing said other adjustment lens, a coupling pin being coupled with said fixing portion, and a right bridge coupled with said coupling pin and associated with said small lead ring;

wherein said right bridge is a nearly J-shaped rod comprising a short rod portion, a connecting rod portion, one end of which is connected with one end of said short rod portion, and a long rod portion connected with the other end of said connecting rod portion; and said right bridge having a pin-supporting portion formed at an unconnected end of said short rod portion for the coupling with said coupling pin, and a second engagement portion formed at an unconnected end of said long rod portion, with a fan shape cut in the shape of a semicircle, the face of said fan facing in the direction of the optical axis, wherein said small lead ring has an engagement groove formed between said flanges fixed respectively to an end periphery on the ocular-optical-system side thereof and to an end periphery on the objective-optical-system side thereof, for engaging with said second engagement portion.

12. The pair of binoculars according to claim 9, wherein said other supporter comprises a fixing portion for fixing said other adjustment lens, a coupling pin being coupled with said fixing portion, and a right bridge coupled with said coupling pin and associated with said small lead ring;

wherein said right bridge is a nearly J-shaped rod comprising a short rod portion, a connecting rod portion, one end of which is connected with one end of said short rod portion, and a long rod portion connected with the other end of said connecting rod portion; and said right bridge having a pin-supporting portion formed at an unconnected end of said short rod portion for the coupling with said coupling pin, and a second engagement portion formed at an unconnected end of said long rod portion, with a fan shape cut in the shape of a semicircle, the face of said fan facing in the direction of the optical axis, wherein said small lead ring has an engagement groove formed between said flanges fixed respectively to an end periphery on the ocular-optical-system side thereof and to an end periphery on the objective-optical-system side thereof, for engaging with said second engagement portion.

13. The pair of binoculars according to claim 5, wherein said one supporter comprises a fixing portion for fixing said one adjustment lens, a coupling pin being coupled with said fixing portion , and a left bridge coupled with said coupling pin and associated with said lead ring;

wherein said left bridge is a nearly J-shaped rod comprising a short rod portion, a connecting rod portion, one end of which is connected with one end of said short rod portion, and a long rod portion connected with the other end of said connecting rod portion; and said left bridge having a pin-supporting portion formed at an unconnected end of said short rod portion for the coupling with said coupling pin and a first engagement portion formed at an unconnected end of said long rod portion and extending in the direction of the optical axis, wherein said large diameter portion of said lead ring comprises a disk-shaped flange portion formed on the objective-optical-system-side end of said small diameter portion , and a cylinder portion standing parallel with said fixed central axis from the periphery of said disk-shaped flange portion wherein said first external thread is formed in the outer circumferential face of said cylinder portion; and said disk-shaped flange portion is provided with an insertion hole for receiving said first engagement portion.

14. The pair of binoculars according to claim 5, wherein said other supporter comprises a fixing portion for fixing said other adjustment lens, a coupling pin being coupled with said fixing portion, and a right bridge coupled with said coupling pin and associated with said small lead ring;

wherein said right bridge is a nearly J-shaped rod comprising a short rod portion, a connecting rod portion, one end of which is connected with one end of said short rod portion, and a long rod portion connected with the other end of said connecting rod portion; and said right bridge having a pin-supporting portion formed at an unconnected end of said short rod portion for the coupling with said coupling pin, and a second engagement portion formed at an unconnected end of said long rod portion, with a fan shape cut in the shape of a semicircle, the face of said fan facing in the direction of the optical axis, wherein said small lead ring has an engagement groove formed between said flanges fixed respectively to an end periphery on the ocular-optical-system side thereof and to an end periphery on the objective-optical-system side thereof, for engaging with said second engagement portion.

15. A pair of binoculars according to claim 4, further comprising a diopter ring provided with a flange portion fixed to an end periphery on the objective-optical-system side thereof, and third teeth of comb formed in the ocular-optical-system-side face of said flange portion, wherein said second rotary member is provided with a protruding stripe along the circumference of the inner sidewall thereof near the ocular-optical-system-side end thereof, and an objective-optical-system-side face of said protruding stripe is provided with fourth teeth of comb to be engaged with said third teeth of comb when the changeover gear is in the second location; and said fourth teeth of comb is disengaged from said third teeth of comb when the changeover gear is in the first location.

16. A pair of binoculars according to claim 4, further comprising a focusing wheel holding ring fixedly mounted on said fixed central shaft, said focusing wheel holding ring being in a shape of a disk, with holes in the circumferential wall thereof, wherein steel balls, each of which is energized in an outward-projecting direction by a coil spring inserted into each of the holes, are placed in the respective entrances of said holes, wherein said focusing wheel connecting ring is provided with a ring-shaped projection formed on the inner circumferential face thereof, whereby said changeover gear is fixedly in the first location when said steel balls are on the side of the objective-optical-system-side face of said ring-shaped projection, and said changeover gear is fixedly in the second location when said steel balls are on the side of the ocular-optical-system-side face of said ring-shaped projection.

17. The pair of binoculars according to claim 4, wherein said one supporter comprises a fixing portion for fixing said one adjustment lens, a coupling pin being coupled with said fixing portion, and a left bridge coupled with said coupling pin and associated with said lead ring;

wherein said left bridge is a nearly J-shaped rod comprising a short rod portion, a connecting rod portion, one end of which is connected with one end of said short rod portion, and a long rod portion connected with the other end of said connecting rod portion; and said left bridge having a pin -supporting portion formed at an unconnected end of said short rod portion for the coupling with said coupling pin, and a first engagement portion formed at an unconnected end of said long rod portion and extending in the direction of the optical axis, wherein said large diameter portion of said lead ring comprises a disk-shaped flange portion formed on the objective-optical-system-side end of said small diameter portion , and a cylinder portion standing parallel with said fixed central axis from the periphery of said disk-shaped flange portion wherein said first external thread is formed in the outer circumferential face of said cylinder portion; and said disk-shaped flange portion is provided with an insertion hole for receiving said first engagement portion.

18. A pair of binoculars according to claim 3, further comprising a diopter ring provided with a flange portion fixed to an end periphery on the objective-optical-system-side thereof, third teeth of comb formed in the ocular-optical-system-side face of said flange portion, and a pair of holding pieces protruding from the objective-optical-system-side face of said flange portion, wherein said small lead ring is provided with flanges fixed respectively to an end periphery on the ocular-optical-system side thereof and to an end periphery on the objective-optical-system side thereof, and said ocular-optical-system-side flange is provided with an engagement projection at a part on the periphery thereof, which engagement projection is engaged with said pair of holding pieces;

said second rotary member is provided with a protruding stripe along the circumference of the inner sidewall thereof near the ocular-optical-system-side end thereof, and an objective-optical-system-side face of said protruding stripe is provided with fourth teeth of comb to be engaged with the third teeth of comb when the changeover gear is in the second location, whereby rotation of the second rotary member is transferred to said small lead ring through the engagement between said fourth teeth of comb and said third teeth of comb, and the engagement between said pair of holding pieces and said engagement projection in this order.

19. A pair of binoculars according to claim 18, further comprising a focusing wheel holding ring fixedly mounted on said fixed central shaft, said focusing wheel holding ring being in a shape of a disk, with holes in the circumferential wall thereof, wherein steel balls, each of which is energized in an outward-projecting direction by a coil spring inserted into each of the holes, are placed in the respective entrances of said holes, wherein said focusing wheel connecting ring is provided with a ring-shaped projection formed on the inner circumferential face thereof, whereby said changeover gear is fixedly in the first location when said steel balls are on the side of the objective-optical-system-side face of said ring-shaped projection, and said changeover gear is fixedly in the second location when said steel balls are on the side of the ocular-optical-system-side face of said ring-shaped projection.

20. The pair of binoculars according to claim 18, wherein said other supporter comprises a fixing portion for fixing said other adjustment lens, a coupling pin being coupled with said fixing portion, and a right bridge coupled with said coupling pin and associated with said small lead ring;

wherein said right bridge is a nearly J-shaped rod comprising a short rod portion, a connecting rod portion, one end of which is connected with one end of said short rod portion, and a long rod portion connected with the other end of said connecting rod portion; and said right bridge having a pin-supporting portion formed at an unconnected end of said short rod portion for the coupling with said coupling pin, and a second engagement portion formed at an unconnected end of said long rod portion, with a fan shape cut in the shape of a semicircle, the face of said fan facing in the direction of the optical axis, wherein said small lead ring has an engagement groove formed between said flanges fixed respectively to an end periphery on the ocular-optical-system side thereof and to an end periphery on the objective-optical-system side thereof, for engaging with said second engagement portion.

* * * * *